United States Patent
Raj et al.

(10) Patent No.: US 10,102,542 B2
(45) Date of Patent: Oct. 16, 2018

(54) OPTIMIZATION AND ATTRIBUTION OF MARKETING RESOURCES

(71) Applicant: Wal-Mart Stores, Inc., Bentonville, AR (US)

(72) Inventors: Nikhil Raj, Menlo Park, CA (US); Patrick L. Harrington, Jr., San Francisco, CA (US); Gary Tang, San Francisco, CA (US); Zachary F. Poley, San Bruno, CA (US); Xiang Xiao, Fremont, CA (US); Long Lin, Sunnyvale, CA (US); Abhimanyu Mitra, San Jose, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 583 days.

(21) Appl. No.: 14/169,794

(22) Filed: Jan. 31, 2014

(65) Prior Publication Data
US 2015/0220971 A1  Aug. 6, 2015

(51) Int. Cl.
*G06Q 30/00* (2012.01)
*G06Q 30/02* (2012.01)

(52) U.S. Cl.
CPC ..... *G06Q 30/0246* (2013.01); *G06Q 30/0244* (2013.01)

(58) Field of Classification Search
CPC ....... G06Q 30/0242–30/0247; G06Q 30/0254; G06Q 30/0201–30/0206
USPC .............. 705/14.41–14.46, 14.52, 7.29–7.35
See application file for complete search history.

(56) References Cited

U.S. PATENT DOCUMENTS

| | | | | |
|---|---|---|---|---|
| 7,428,555 | B2 * | 9/2008 | Yan ........................ | G06Q 30/02 |
| 8,543,453 | B1 * | 9/2013 | Calvert .................. | G06Q 30/00 |
| | | | | 705/14.41 |
| 8,788,770 | B2 * | 7/2014 | Agombar ............ | G06F 11/1448 |
| | | | | 711/162 |
| 8,805,715 | B1 * | 8/2014 | Jones ..................... | G06Q 30/02 |
| | | | | 705/14.66 |
| 8,935,249 | B2 * | 1/2015 | Traub ................ | G06F 17/30657 |
| | | | | 707/737 |
| 9,009,064 | B2 * | 4/2015 | Karlin .................... | G06Q 30/02 |
| | | | | 705/14.16 |

(Continued)

FOREIGN PATENT DOCUMENTS

| | | | | |
|---|---|---|---|---|
| WO | WO2000062331 | * | 10/2000 | ............. G06F 17/60 |
| WO | WO-2009006606 A1 * | 1/2009 | ............. G06Q 30/02 |

OTHER PUBLICATIONS https://web.archive.org/web/20131010022754/http://www.tfidf.com/ (Internet Archive of www.tfidf.com as published on Oct. 10, 2013) (Year: 2013).*

(Continued)

*Primary Examiner* — James A Reagan
(74) *Attorney, Agent, or Firm* — Bryan Cave Leighton Paisner LLP (57) ABSTRACT

Example systems and methods for optimization and attribution of marketing resources are described. In one implementation, a method retrieves transaction data associated with one or more offline stores and user data of users that are exposed to a marketing campaign. The method also correlates the transaction data to the user data to measure marketing attribution and modify the marketing campaign.

23 Claims, 6 Drawing Sheets

(56) References Cited

U.S. PATENT DOCUMENTS

| | | | | |
|---|---|---|---|---|
| 2012/0016738 A1* | 1/2012 | Ouimet | ............... | G06Q 30/02 |
| | | | | 705/14.46 |
| 2013/0035975 A1* | 2/2013 | Cavander | ............ | G06Q 30/02 |
| | | | | 705/7.22 |
| 2014/0032304 A1* | 1/2014 | Kent | ................. | G06Q 30/02 |
| | | | | 705/14.43 |
| 2015/0100423 A1* | 4/2015 | Oldham | .......... | G06Q 30/0275 |
| | | | | 705/14.54 |

OTHER PUBLICATIONS

Kenyon, Geoff. How to Track the Online ROI of Offline Advertising. (Nov. 11, 2013). Retrieved online May 21, 2018. https://moz.com/blog/how-to-track-online-roi-of-offline-advertising (Year: 2013).*

* cited by examiner

OPTIMIZATION AND ATTRIBUTION OF MARKETING RESOURCES

TECHNICAL FIELD

The present disclosure relates to methods and systems for optimization and attribution of marketing resources.

BACKGROUND

Marketing is a process of communicating the value of a product or service to consumers, for the purpose of influencing consumers to result in sale of the product or service. Marketing can be a major expense for manufacturers and retailers, and often entails a large number of marketing media channels such as, for example, printed media, radio, outdoor billboards, television, etc. Recently, new and unique marketing media channels (e.g., online display, video games, etc.) have been used to communicate the value of products or services to consumers. The proliferation of these new media channels has made the task of assessing the relationship between marketing campaigns, marketing media channels, and user behavior even more difficult.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which includes one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

Figure 1:
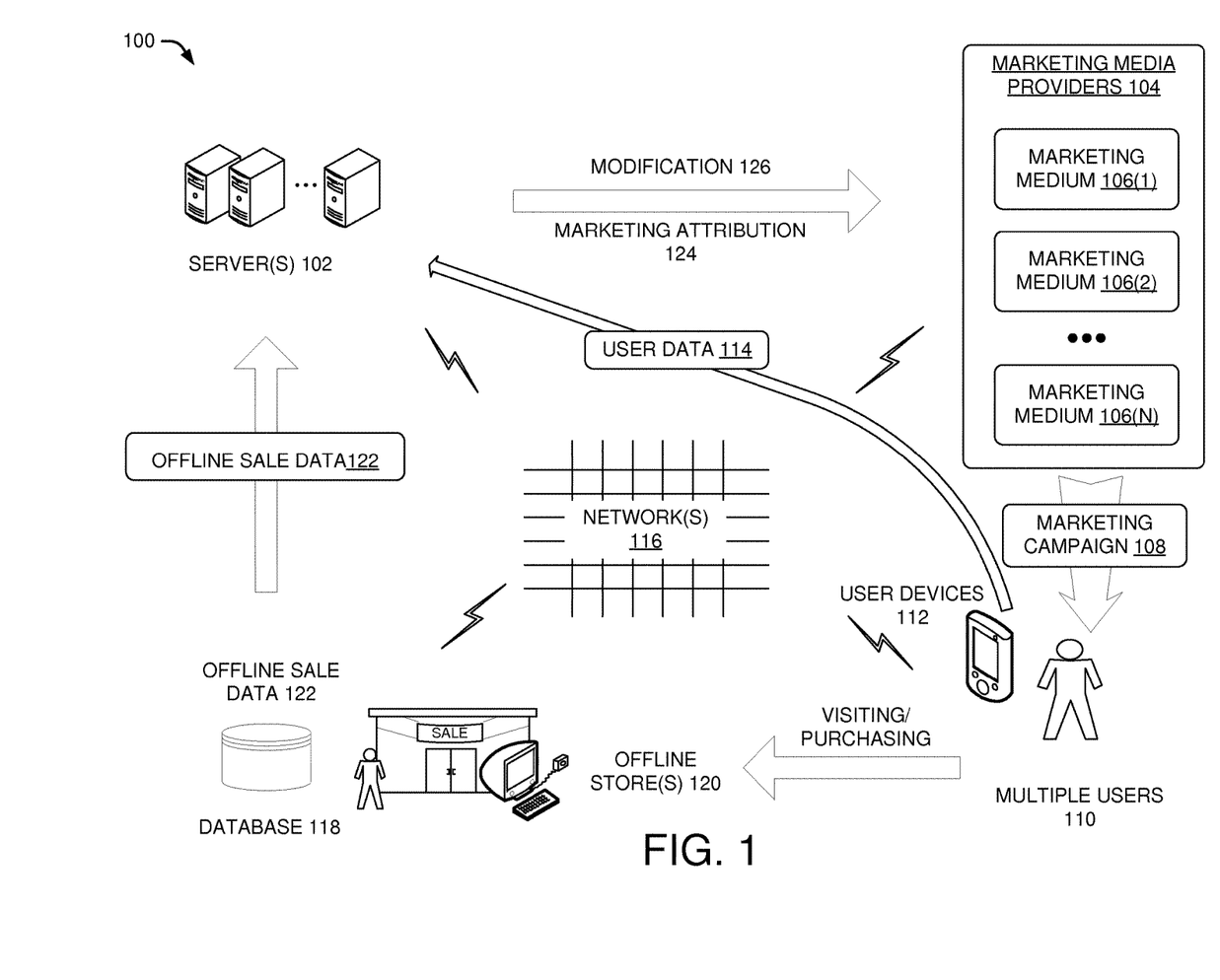
FIG. 1 is a block diagram depicting a computing environment within which an example embodiment of the present disclosure may be implemented.

FIG. 1 is a block diagram depicting a computing environment 100 within which an example embodiment of the present disclosure may be implemented. Computing environment 100 includes server(s) 102 that may collect, store, and/or analyze information representing transaction data and/or user behaviors, that are associated with one or more marketing campaigns, to facilitate marketing attribution and/or management of the marketing campaigns.

Server 102 is coupled to various marketing media providers 104. In some embodiments, there are multiple servers 102. For simplicity, the description hereinafter interchangeably refers to the one or more servers 102 as server 102. Marketing media providers 104 provide market media including, for example, marketing medium 106(1), marketing medium 106(2), . . . , and marketing medium 106(n). Marketing media 106 may include display, online, radio, outdoor, television, video games, print, cell phones, personal digital assistants, email, etc. that are associated with one or more items (e.g., a product and/or a service) and/or one or more brands of an item. In some embodiments, a marketing medium 106(n) may include one or more types of marketing channels. For example, the marketing channels may include one or more advertising exchanges, one or more search engines, one or more websites, one or more online video sites, one or more television networks, one or more television programs, one or more social networks, one or more telecommunication networks, etc. The marketing media 106 may be implemented using various marketing techniques, such as direct marketing, promotions, product placement, etc.

Marketing media providers 104 assist implementation of a marketing campaign 108 using marketing media 106, to which multiple users 110 are exposed. User data 114 associated with marketing campaign 108 may be collected, using user devices 112 associated with multiple users 110, and transmitted to server 102. In some embodiments, user data 114 may include a collection of records of user information and behavior that is, for example, associated with online and/or offline transactions executed by users 110. The user data 114 may be obtained from at least one of store receipts, credit card purchases, mail-order requests, information inquiries, browsers, cookies, and other sources related to customer preferences or predisposition to purchasing or using an item.

Server 102 may connect one or more network(s) 116 to exchange information with marketing media providers 104 and user devices 112. Each of user devices 112 may be a mobile or desktop computer, a personal data assistant (PDA), an internet appliance, an internet enabled mobile phone, a server or any other computing device configured with a network connection. Network(s) 116 may include wired and/or wireless networks that enable communications between the various computing devices described in environment 100. In some embodiments, network(s) 116 may include local area networks (LANs), wide area networks (WAN), mobile telephone networks (MTNs), and other types of networks, possibly used in conjunction with one another, to facilitate communication between the various computing devices (e.g., user devices 112, server 102, and/or marketing media providers 104).

Server 102 may also exchange information with database 118 associated with one or more offline stores 120 via network 116. For simplicity, the description hereinafter interchangeably refers to the one or more offline stores 120 as offline store 120. Offline store 120 may include a physical location where items, e.g., merchandises, are kept for future use. For example, offline store 120 may include a retailer store, a restaurant, a gas station, a beauty salon, a fitness center, and other stores. In some embodiments, offline store 120 may include stores having no online presence or stores that are otherwise not integrated with a specified networked purchasing service. In some instances, offline purchase may include the multiple users 110 visiting offline store 120 and purchasing one or more items in offline store 120.

Database 118 may store information associated with transaction data (e.g., offline sale data 122) of transactions that occur in offline store 120. Transaction data may represent specific elements of one or more transactions. For example, transactional data may include pricing changes, sales orders, financial transactions, revenues, conversional rates, profits, and/or any other business transaction data associated with one or more items and/or one or more certain brands of an item. In some instances, a conversion rate may refer to the proportion of visitors to an offline store who actually made one or more purchases.

In some embodiments, database 118 may include offline sale data 122 that includes the transaction data of offline store 120 during a predetermined time period, e.g., the period of time during which marketing campaign 108 is on. In some embodiments, offline sale data 122 may include real-time data of transactions that occur in offline store 120. In these instances, server 102 may directly retrieve offline sale data 122 in response to a determination that offline sale data 122 is available at offline store 120 as a result of purchases made at offline store 120.

After retrieving user data 114 and offline sale data 122, server 102 may correlate user data 114 to offline sale data 122 to determine marketing attribution 124 of marketing campaign 108 to marketing media providers 104. Server 102 may also perform modification 126 to marketing campaign 108. In some embodiments, marketing attribution 124 may include a process of identifying a set of user actions, or events, that contribute in some manner to a desired outcome, and then assigning a value to each of these events. For example, marketing attribution 124 may be measured to quantify the influence each advertising impression (e.g., one or more elements of a marketing medium and/or a marketing channel) has on a consumer's decision to make a purchase. In some embodiments, marketing attribution 124 may include cross-channel marketing attribution including a process of assigning credits to various online and/or offline marketing communications (e.g., marketing campaigns) to evaluate their effectiveness in converting consumers into paying customers. For example, the marketing campaigns may include marketing media 106 that are provided by marketing media providers 104 and presented or otherwise provided to user 110 via multiple marketing channels 202.

Figure 2:
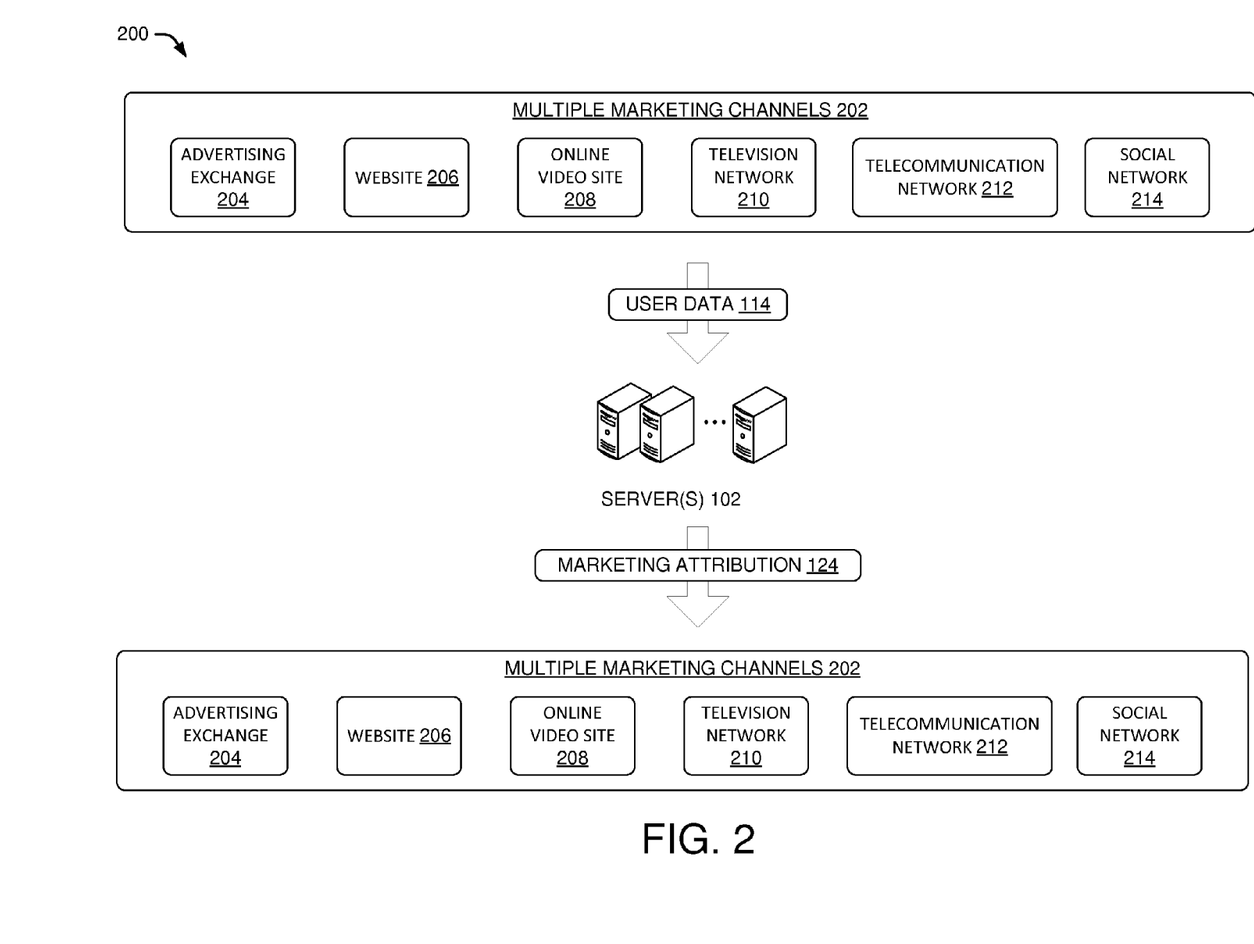
FIG. 2 is a block diagram depicting a computing scheme within which an example embodiment of the present disclosure may be implemented.

FIG. 2 is a block diagram depicting a computing scheme 200 within which an example embodiment of the present disclosure may be implemented. For marketing campaign 108, marketing media 106 may be presented or otherwise provided to multiple users 110 via multiple marketing channels 202. Marketing channels 202 may include an advertising exchange 204, a website 206, an online video site 208, a television network 210, a telecommunication network 212, and/or a social network 214, etc. After multiple users 110 are exposed to multiple marketing channels 202, server 102 may retrieve user data 114 of multiple users 110 during marketing campaign 108. Server 102 may also retrieve offline sale data 122 from offline store 120.

Server 102 may correlate offline sale data 122 to user data 114 to identify a group of users that are exposed to marketing campaign 108 as well as visiting and purchase one or more items in offline store 120. In some embodiments, server 102 may correlate offline sale data 122 to user data 114 using a matching algorithm. Suppose that certain users are exposed to the marketing campaign and some of these particular users may visit one or more offline stores and purchase an item associated with marketing campaign 108. These particular users may be identified using the matching algorithm based at least in part on the correlation between transaction data from offline store 120 and user data 114 that are retrieved during the marketing campaign 108. For example, these users may be identified by matching information of one or more marketing data attributes between offline sale data 122 (e.g., data related to store conversion rates) and user data 114.

A group of users may be represented by one or more marketing data attributes. In some embodiments, marketing data attributes may include characteristics of data relating marketing of an item or a brand of items. The marketing data attributes may include user attributes, campaign attributes, a combination of thereof, etc. User attribute may be a characteristic of a user (e.g., a customer) or set of users that is related to, such as, identities, demographic, geographic, psychographic characteristics, buying patterns, creditworthiness, purchase history, or other user information. Campaign attribute may be a marketing data attribute related to one or more parts of marketing campaign elements, for example, a location where the advertisement is placed, a type of marketing media, a type of target user group, etc.

Based on the correlation between offline sale data 122 and user data 114, server 102 may determine marketing attribution 124 of one or more marketing data attributes to, for example, one or more channels of multiple marketing channels 202 and/or one or more multiple marketing media 106.

Figure 3:
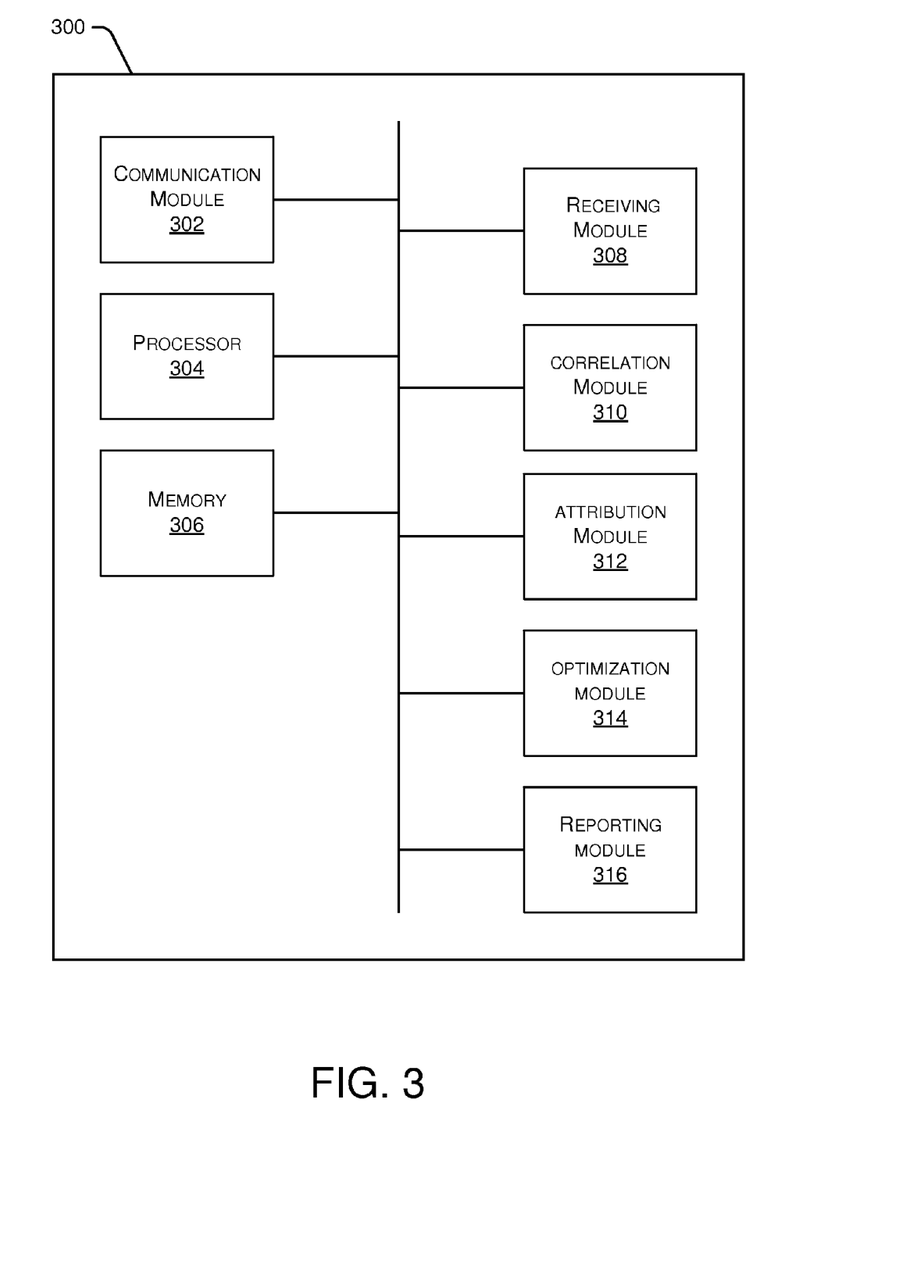
FIG. 3 is a block diagram depicting an embodiment of a computing device configured to implement systems and methods of the present disclosure.

FIG. 3 is a block diagram depicting an embodiment of a computing device 300 configured to implement systems and methods of the present disclosure. Computing device 300 (e.g., server 102) performs various functions related to resource allocation for infrastructure engineering, as discussed herein. In some embodiments, computing devices 300 may include ones of computing devices that cooperatively implement the functions described herein. Computing device 300 includes a communication module 302, a processor 304, and a memory 306. Communication module 302 allows computing device 300 to communicate with other systems, such as communication networks, other servers, etc. Processor 304 executes one or more sets instructions to implement the functionality provided by computing device 300. Memory 306 stores these instructions as well as other data used by processor 304 and other modules contained in computing device 300.

Computing device 300 also includes a receiving module 308 configured to retrieve transaction data of offline store transactions during a marketing campaign associated with an item. Receiving module 308 may also retrieve user data of users that are exposed to multiple marketing channels (e.g., multiple marketing channels 202) associated with the marketing campaign. For example, the transaction data may include a revenue and a conversion rate of the item or the brand of the item in one or more offline stores during the marketing campaign.

In some embodiments, the multiple marketing channels may include at least one of advertising exchanges, search engines, websites, online video sites, television networks, television programs, social networks, etc. In these instances, the marketing campaign may be associated with marketing media including at least one of display, online, radio, outdoor, television, video games, print, cell phones, personal digital assistants, and emails that are associated with the item or the brand of the item. For example, receiving module 308 may retrieve offline sale data 122 form database 118 and retrieve user data 114 from user devices 112.

Computing device may also include a correlation module 310 configured to correlate the transaction data to the user data. In some embodiments, the transaction data and the user data may be correlated to identify a group of users sharing one or more marketing data attributes. For example, the users may be identified using a matching algorithm based on the correlation between transaction data from offline stores and user data that are retrieved during the marketing campaign. For example, these users may be identify by matching information of one or more marketing data attributes between the transaction data (e.g., data related to store conversion rates) and user data (e.g., user online behavior data).

Computing device 300 may also include an attribution module 312 configured to determine attribution of the marketing channels to the offline store transactions based at least in part on the correlation. In some embodiments, attribution module 312 may determine the attribution of the marketing channels after removing a market basket impact of the marketing campaign. The market Basket impact may include a measured marketing campaign's impact associated with a list of items used, for example, to track the progress of inflation in an economy or specific market. For example, the list may include a number of the most commonly bought food (e.g., milk, banana, bread, etc.) and household items (e.g., towels, books, chairs, etc.).

In some embodiments, attribution module 312 determine the attribution of the marketing channels using a proxy control group algorithm. In these instances, correlating module 310 may correlate the transaction data with the user data to identify a group of users who are exposed to the marketing campaign and purchased the item, the group of users sharing one or more marketing data attributes. Correlating module 310 may also identify an additional group of users representing users that are exposed to the marketing campaign using a proxy control group algorithm. Then, attribution module 312 may determine the attribution of the marketing channels based at least in part on the user data of the group of users and the additional group of users.

Computing device 300 may also include an optimization module 314 configured to optimize the marketing campaign based on the correlating. In some embodiments, optimization module 314 may modify one or more campaign attributes before, during, and/or after one or more marketing campaigns. Optimization module 314 may change a set of attributes to improve a marketing campaign during the marketing campaign. For example, modifications may include changing a location of marketing media, providing a high bid for an online search engine, changing marketing media to target a different group of customers, etc.

In some embodiments, optimization module 314 may determine an incremental impact of one or more marketing data attributes on the revenue or the conversion rate of the item or the brand of the item in the one or more offline stores during the marketing campaign. Optimization module 314 may also modify the marketing campaign based on the determined incremental impact. For example, optimization module 314 move marketing media for a marketing channel to another marketing channel, modify the market media associated with the one or more marketing data attributes, cancel the marketing campaign in a marketing channel, and/or modify implementation of the market campaign.

Computing device 300 may also include a reporting module 316 configured to provide one or more reports associated with marketing attribution 124, modification 126, user data 114, and/or offline sale data 122. In some embodiments, reporting module 316 may also facilitate multiple transformations of these data for one or more targets associated with, for example, marketing attribution monitoring, real-time modification of marketing campaign, etc.

Figure 4:
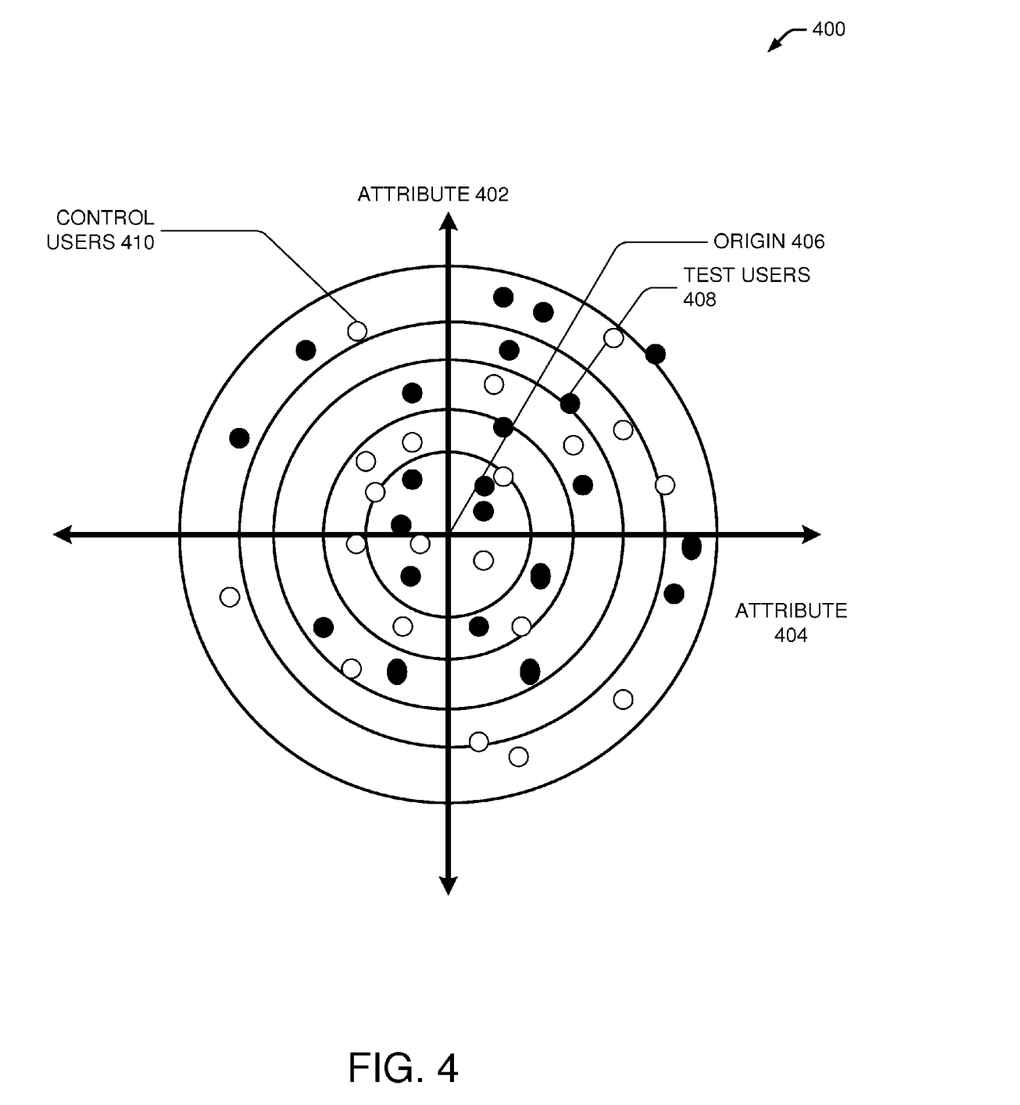
FIG. 4 is a diagram scheme illustrating incremental impact measurement using a proxy control group algorithm.

FIG. 4 is a diagram scheme 400 illustrating incremental impact measurement using a proxy control group algorithm. Scheme 400 demonstrates a user of the proxy control group algorithm on an attribute 402 and an attribute 404 (e.g., user attributes and/or campaign attributes) while more attributes may be used for the matching. Scheme 400 includes a multidimensional space and an origin 406 of the space representing the best match on attributes 402 and 404. Accordingly, the matches are weaker at points farther away from origin 406, while more users may be included for matching.

Scheme 400 also includes test users 408 and control users 410. Test users 408 may include matched users that are identified to be exposed to the marketing campaign as well as visit the offline store and/or purchase the item. Control users 410 may be generated using a proxy control group algorithm and represent all users that are exposed to the marketing campaign. In some embodiments, test users 408 may be first mapped into the multiple dimensional space, and control users generated by the proxy group algorithm are also mapped into this space. Server 102 may determine the quality of matching, which may be represented by a distance from the origin 406 while balancing the volume (e.g., a number of matched users) for accuracy. Then, server 102 may make adjustment for biases in test users 408 and control users 410.

In order to estimate the incremental effect of advertising (e.g., marketing campaign 108), the proposed scheme measures the difference in behavior between two sets of customers of identical number of customers, one set having been exposed to marketing campaign 108 and the other set having not been exposed to marketing campaign 108. An example behavior may be the act of purchasing an item. These two sets of customers are not known a priori. Rather, a first set of customers (test group) having been exposed to marketing campaign 108 is known, and another set of customers (control group) identical to the first set of customers is to be found a posteriori.

In practice, it may not be feasible to find identical sets of customers. Instead, a collection of highly descriptive features from a test group is learned to find a control group that has the same behavioral features. For example, customers who have browsed the Internet for videos and visited an online store in a particular geographical region in the past given number of days may be defined as the control group.

The proposed scheme follows a branch of text mining and information retrieval known as topic modeling. The goal is to reveal the major themes or topics from a set of documents. In the present disclosure, "themes" are customer archetypes (e.g., video game shopper, new parent, healthy-lifestyle shopper, etc.) who are defined by a specific set of behaviors. The analogy is as follows: each customer represents a document, and the customer's browsing and purchasing behaviors represent the words of the document.

Given a set of customers, the proposed scheme finds the dominant archetype of that set of customers and assigns each customer to a corresponding archetype to whom the respective customer is most similar. This reduces a set of customers to a collection of archetypes and their relative proportions. Mathematically, this can be interpreted as a probability distribution over archetypes. The proposed scheme finds a separate set of customers whose collective make-up has the same probability distribution over the same archetypes.

As an example, given a first set of customers ($customer_1$, $customer_2$, ... $customer_{K-1}$, $customer_K$), as the test group, and a set of archetypes learned over existing data ($archetype_1$, $archetype_2$, ... $archetype_N$), each customer in the first set of customers is matched or otherwise correlated to a corresponding archetype in the set of archetypes. For instance, $customer_1$ and $customer_2$ may be correlated to $archetype_1$, $customer_{K-1}$ may be correlated to $archetype_2$, and $customer_K$ may be correlated to $archetype_N$. Based on the number of customers correlated to each archetype, a corresponding proportion may be computed for each archetype to yield a set of proportions such as, for example, ($w_1\%$, $w_2\%$, ... $w_N\%$), where $w_1\%$ corresponds to $archetype_1$, $w_2\%$ corresponds to $archetype_2$, ... and $w_N\%$ corresponds to $archetype_N$. The sum of $w_1\%$, $w_2\%$, ... and $w_N\%$ is 100%. Then, with a second set of customers ($customer_1'$, $customer_2'$, ... $customer_{K-1}'$, $customer_K'$), as the control group, each customer in the second set of customers is matched or otherwise correlated to a corresponding archetype in the set of archetypes ($archetype_1$, $archetype_2$, ... $archetype_N$). For instance, $customer_1'$ and $customer_3'$ may be correlated to $archetype_2$, $customer_2'$ may be correlated to $archetype_1$, and $customer_K'$ may be correlated to $archetype_{N-1}$. Similarly, a corresponding proportion may be computed for each archetype to yield a set of proportions such as, for example, ($w_1'\%$, $w_2'\%$, ... $w_N'\%$). The sum of $w_1'\%$, $w_2'\%$, ... and $w_N'\%$ is 100%.

Each customer's behaviors (e.g., browsing and/or purchasing) are converted to a vector space notation where each element is the term frequency inverse document frequency (tfidf) for the behavior. Each customer represents a row in an M×N matrix with M customers and N distinct types of behaviors. Once the matrix is constructed, the latent semantic indexing algorithm may be used to find the customer archetypes. Customers are assigned to the archetype to which it has minimum cosine distance. Once the probability distributions are determined, acceptance rejection sampling is applied in order to produce similar probability distributions. For example, given ($w_1$, $w_2$, ... $w_N$) and ($w_1'$, $w_2'$, ... $w_N'$), acceptance rejection sampling may be applied to ($w_1'$, $w_2'$, ... $w_N'$) to obtain ($w_1''$, $w_2''$, ... $w_N''$), where ($w_1''$, $w_2''$, ... $w_N''$) is approximately identical to ($w_1$, $w_2$, ... $w_N$).

Figure 5:
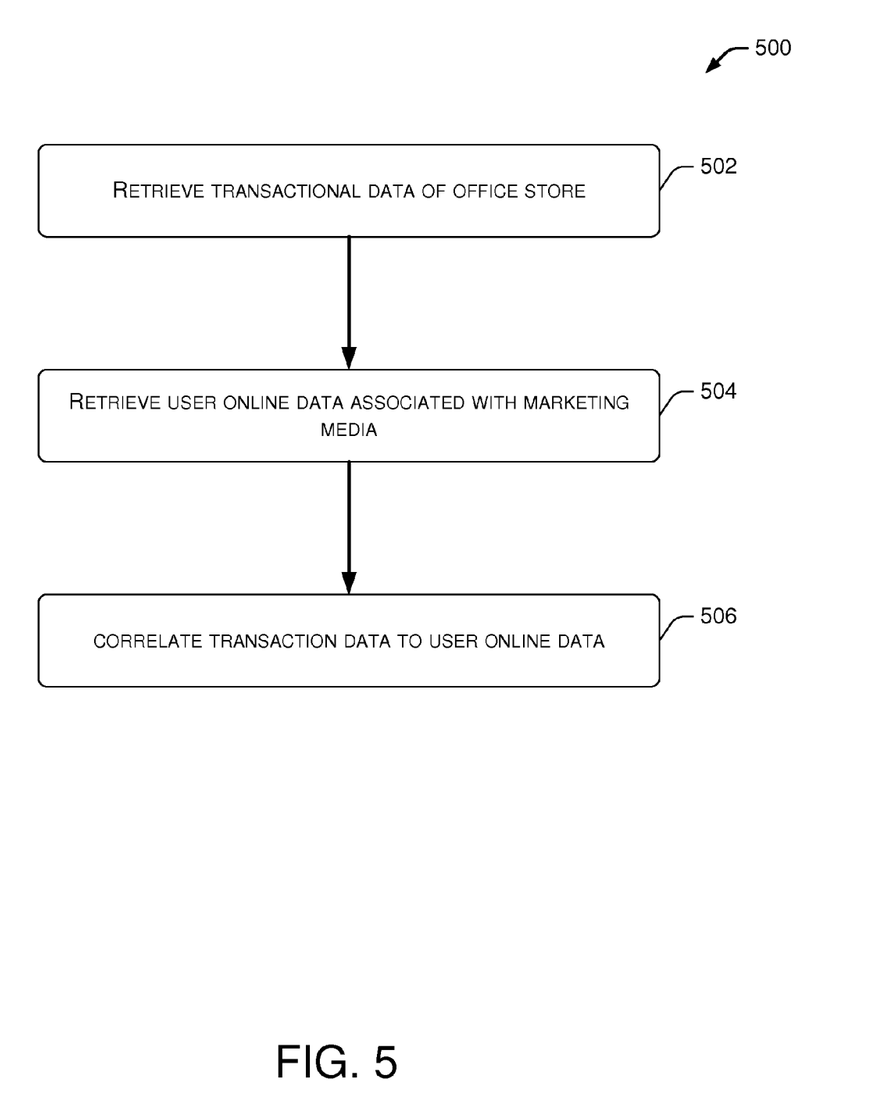
FIG. 5 is a flowchart diagram of an embodiment of a process for correlating offline transaction data to user data.

FIG. 5 is a flowchart diagram of an embodiment of a process 500 for correlating offline transaction data to user data. Example process 500 includes one or more operations, actions, or functions. Although illustrated as discrete blocks, various blocks may be divided into additional blocks, combined into fewer blocks, or eliminated, depending on the desired implementation. Process 500 may be implemented by one or more processors including, for example, the computing device 300. For illustrative purposes, the operations described below are performed by one or more processors, e.g., one or more processors of server 102 as shown in FIG. 1 and FIG. 2 or processor 304 of computing device 300 as shown in FIG. 3.

At 502, server 102 may retrieve transaction data of offline store transactions during a marketing campaign associated with an item.

At 504, server 102 may retrieve user data of users that are exposed to multiple marketing channels associated with the marketing campaign.

After or during the retrieval, server 102 may correlate the transaction data to the user data at 506. In some embodiments, server 102 may correlate the transaction data with the user data to identify a group of users who are exposed to the marketing campaign and purchased the item. The group of users may share one or more marketing data attributes. In some instances, server 102 may identify an additional group of users representing users that are exposed to the marketing campaign using a proxy control group algorithm, and then determine the attribution of the marketing channels based at least in part on the user data of the group of users and the additional group of users.

In some embodiments, the transaction data may include a revenue and a conversion rate of the item or the brand of the item in one or more offline stores during the marketing campaign. The multiple marketing channels may include at least one of advertising exchanges, search engines, websites, online video sites, television networks, television programs, and social networks. The marketing campaign may be associated with marketing media including at least one of display, online, radio, outdoor, television, video games, print, cell phones, personal digital assistants, and emails that are associated with the item or the brand of the item.

In some embodiments, server 102 may also determine attribution of the marketing channels to the offline store transactions based at least in part on the correlating. In these instances, server 102 may determine the attribution of the marketing channels after removing a market basket impact of the marketing campaign.

In some embodiments, server 102 may modify the marketing campaign based on the correlating. For example, server 102 may determine an incremental impact of one or more marketing data attributes on the revenue or the conversion rate of the item or the brand of the item in the one or more offline stores during the marketing campaign, and then modify the marketing campaign based on the determined incremental impact.

For example, there are several marketing data attributes that are part of advertising campaign elements such as where the ad is placed, what type of creative, what kind of user, etc. Server 102 may determine the incremental impact of each of these attributes to store sales and improve the incremental impact of the campaign. The proxy control group algorithm may be used to identify the incremental impact for each attribute, while, for example, keeping other attributes the same. Server 102 may measure the group users and the proxy control group users, and the difference between these groups is whether users are exposed to marketing campaign. Server 102 may also deal with sparse data issues associated with the algorithm. Also, the proxy control group algorithm may be used to determine which marketing data attribute or set of attributes is driving conversion rates in one or more offline stores, and which marketing data attributes have enough data behind them to make an optimization decision. Examples of an optimization decision is shown in table 1.

| Campaign Attribute | Conversion Rate | Optimization Action |
|---|---|---|
| Attribute 1 | W % | Not enough data |
| Attribute 2 | X % | Bid higher |
| Attribute 3 | Y % | Delete |
| Attribute 3 | Z % | Bid lower |

In some embodiments, the modification of the marketing campaign may include at least one of moving marketing media for a marketing channel of the multiple marketing channels to another marketing channel of the multiple marketing channels, modifying the market media associated with the one or more marketing data attributes, canceling the marketing campaign in a marketing channel of the multiple marketing channels, and modifying implementation of the market campaign.

Figure 6:
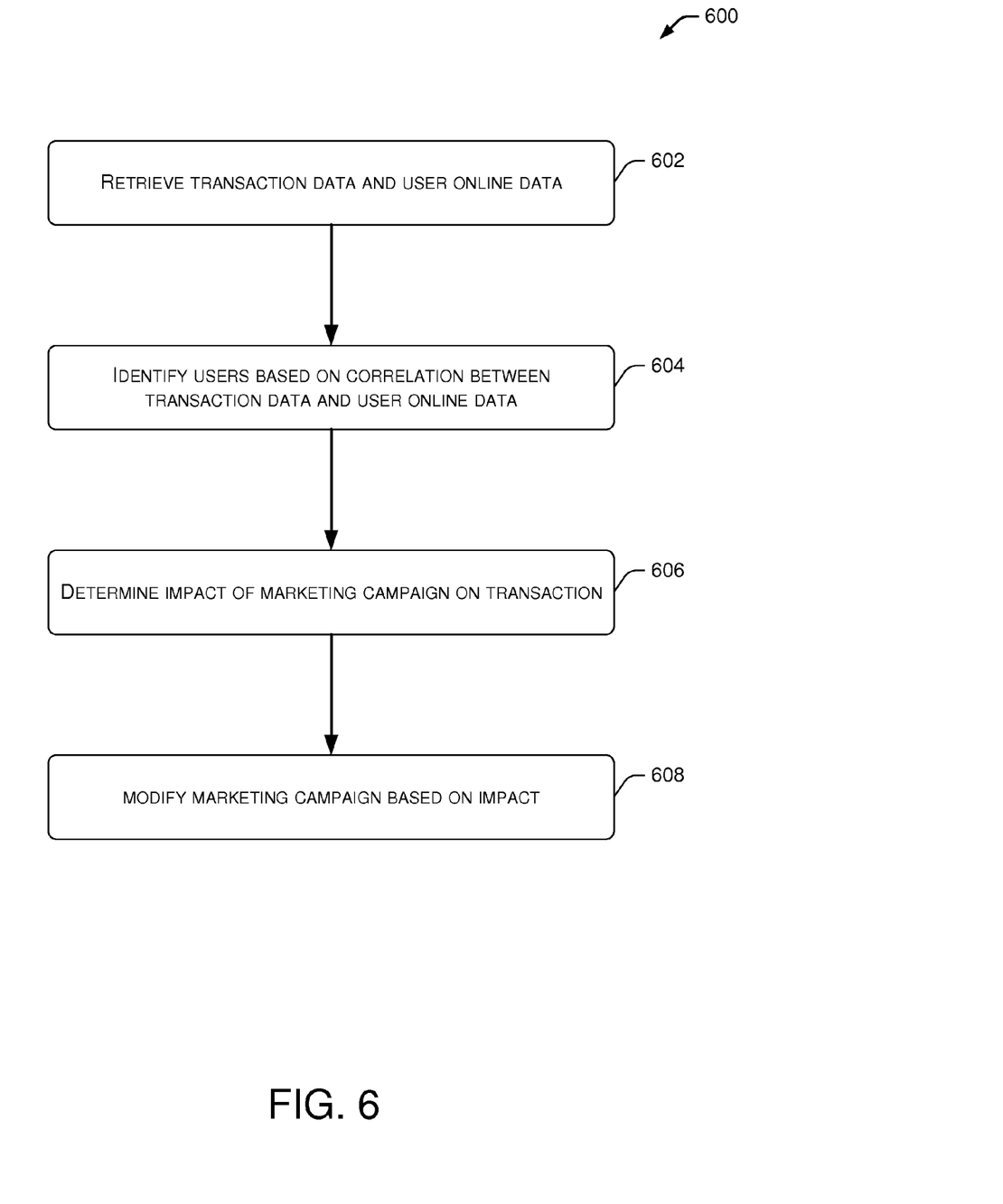
FIG. 6 is another flowchart diagram of an embodiment of a process for modifying a marketing campaign using correlation between offline transaction data and user data.

FIG. 6 is another flowchart diagram of an embodiment of a process 600 for modifying a marketing campaign using correlation between offline transaction data and user data. Example process 600 includes one or more operations, actions, or functions. Although illustrated as discrete blocks, various blocks may be divided into additional blocks, combined into fewer blocks, or eliminated, depending on the desired implementation. Process 600 may be implemented by one or more processors including, for example, the computing device 300. For illustrative purposes, the operations described below are performed by one or more processors, e.g., one or more processors of server 102 as shown in FIG. 1 and FIG. 2 or processor 304 of computing device 300 as shown in FIG. 3.

At 602, server 102 may retrieve transaction data of offline store transactions during a marketing campaign associated with an item, and retrieve user data of users that are exposed to multiple marketing channels associated with the marketing campaign. The transaction data may include a revenue and a conversion rate of the item or the brand of the item in one or more offline stores during the marketing campaign.

For example, the multiple marketing channels may include at least one of advertising exchanges, search engines, websites, online video sites, television networks, television programs, and social networks. The marketing campaign is associated with marketing media including at least one of display, online, radio, outdoor, television, video games, print, cell phones, personal digital assistants, and emails that are associated with the item or the brand of the item.

At 604, server 102 may identify multiple users based on a correlation between the transaction data and user data.

At 606, server 102 may determine one or more impacts of the marketing campaign on the transaction data of the multiple users. In some embodiments, server 102 may determine an incremental impact of one or more marketing data attributes on the revenue or the conversion rate of the item or the brand of the item in the one or more offline stores during the marketing campaign.

At 608, server 102 may modify the marketing campaign based on the one or more impacts. For example, server 102 may modify the marketing campaign based on the determined incremental impact.

In some embodiments, server 102 may also determine attribution of the marketing channels to the offline store transactions based at least in part on the correlating. In these instances, server 102 may determine the attribution of the marketing channels after removing a market basket impact of the marketing campaign.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. A method comprising:

retrieving, with a computer system using one or more processors, transaction data of offline store transactions at one or more offline stores during an online marketing campaign associated with an item, the transaction data comprising: (1) store conversion rate data of the item in the one or more offline stores during the online marketing campaign; and (2) a revenue of the item or a brand of the item in the one or more offline stores during the online marketing campaign;

retrieving, with the computer system, user data from user devices of a plurality of users that are exposed to a plurality of online marketing channels associated with the online marketing campaign, the user data comprising online behavior data of the plurality of users obtained by text mining one or more of an Internet browsing history or Internet cookies associated with each user of the plurality of users;

correlating, with the computer system, the transaction data to the user data to identify at least a first user of the plurality of users exposed to the plurality of online marketing channels that also has purchased the item at an offline store of the one or more offline stores by matching information of one or more marketing data attributes between (a) the store conversion rate data of the transaction data and (b) the online behavior data of the user data;

determining, with the computer system and using a first set of rules, at least one cause of an incremental impact of the one or more marketing data attributes, by determining which of the one or more marketing data attributes is a factor in driving the revenue or the store conversion rate data of the item or the brand of the item in the one or more offline stores, on:

(1) the item in the one or more offline stores during the online marketing campaign; or (2) the brand of the item in the one or more offline stores during the online marketing campaign, wherein the first set of rules comprises:

identifying test users to be exposed to the online marketing campaign and who visit the one or more offline stores during the online marketing campaign;

mapping the test users into a multidimensional space, wherein an origin of the multidimensional space represents a best match on the one or more marketing data attributes;

identifying, using a proxy control group algorithm, a subgroup of users of the plurality of users representing users of the plurality of users that are exposed to the online marketing campaign to identify the incremental impact for each of the one or more marketing data attributes while keeping other ones of the one or more marketing data attributes constant;

mapping the subgroup of users into the multidimensional space;

determining a quality of matching the information of the one or more marketing data attributes; and adjusting for biases in the test users and the subgroup of users, wherein determining the at least one cause of the incremental impact of the one or more marketing data attributes further comprises determining the at least one cause of the incremental impact of the one or more marketing data attributes based at least in part on second user data of the test users and the user data of the subgroup of users; and modifying, with the computer system, the online marketing campaign in real-time based at least in part on the at least one cause of the incremental impact as determined.

2. The method of claim 1, further comprising:

determining attribution of the plurality of online marketing channels to transactions at the one or more offline stores based at least in part on the correlating.

3. The method of claim 1, wherein modifying the online marketing campaign in real-time further comprises:

modifying the online marketing campaign in real time based at least in part on the at least one cause of the incremental impact, as determined, and the correlating.

4. The method of claim 1, wherein modifying the online marketing campaign in real-time further comprises at least one of:

moving online marketing media for a first online marketing channel of the plurality of online marketing channels to another online marketing channel of the plurality of online marketing channels;

modifying the online marketing media associated with the one or more marketing data attributes;

canceling the online marketing campaign in a second online marketing channel of the plurality of online marketing channels; or modifying implementation of the online marketing campaign.

5. The method of claim 1, wherein the plurality of online marketing channels comprise at least one of one or more advertising exchanges, one or more search engines, one or more websites, one or more online video sites, or one or more social networks.

6. The method of claim 1, wherein the online marketing campaign is associated with marketing media comprising media transmitted via at least one of online, radio, video games, cell phones, personal digital assistants, or emails that are associated with the item or the brand of the item.

7. The method of claim 1, further comprising:

determining attribution of the plurality of online marketing channels to transactions at the offline store based at least in part on the correlating, wherein the plurality of online marketing channels comprise at least one of one or more advertising exchanges, one or more search engines, one or more websites, one or more online video sites, or one or more social networks;

modifying the online marketing campaign in real-time based at least in part on the correlating, wherein the online marketing campaign is associated with marketing media comprising media transmitted via at least one of online, radio, video games, cell phones, personal digital assistants, or emails that are associated with the item or the brand of the item; and modifying the online marketing campaign based at least in part on the at least one cause of the incremental impact, as determined, wherein modifying the online marketing campaign comprises at least one of:

moving online marketing media for a first online marketing channel of the plurality of online marketing channels to another online marketing channel of the plurality of online marketing channels, the marketing media comprising the online marketing media;

modifying the online marketing media associated with the one or more marketing data attributes;

canceling the online marketing campaign in a second online marketing channel of the plurality of online marketing channels; or modifying implementation of the online marketing campaign; and wherein the first set of rules comprises:

matching each user of the test users to a corresponding archetype in a set of archetypes learned over existing data, each archetype in the set of archetypes comprising a specific customer behavior;

determining a first proportion for each archetype in the set of archetypes based on a number of users of the test users matched to each archetype in the set of archetypes;

matching each user of the subgroup of users to a corresponding archetype in the set of archetypes;

determining a second proportion for each archetype in the set of archetypes based on a number of users of the subgroup of users matched to each archetype in the set of archetypes;

converting a behavior of each user of the test users and the subgroup of users to a vector space notation where each element is a term frequency inverse document frequency ("tfidf") for the behavior and each user of the test users and the subgroup of users represents a row in an M×N matrix with M users and N distinct behaviors; and using a semantic indexing algorithm to find archetypes of the set of archetypes for other users of the plurality of users by assigning each user of the other users to an archetype of the set of archetypes to which each user of the other users has a minimum cosine distance.

8. The method of claim 1, wherein the first set of rules further comprise:

matching each user of the test users to a corresponding archetype in a set of archetypes learned over existing data, each archetype in the set of archetypes comprising a specific customer behavior;

determining a first proportion for each archetype in the set of archetypes based on a number of users of the test users matched to each archetype in the set of archetypes;

matching each user of the subgroup of users to a corresponding archetype in the set of archetypes;

determining a second proportion for each archetype in the set of archetypes based on a number of users of the subgroup of users matched to each archetype in the set of archetypes;

converting a behavior of each user of the test users and the subgroup of users to a vector space notation where each element is a term frequency inverse document frequency ("tfidf") for the behavior and each user of the test users and the subgroup of users represents a row in an M×N matrix with M users and N distinct behaviors; and using a semantic indexing algorithm to find archetypes of the set of archetypes for other users of the plurality of users by assigning each user of the other users to an archetype of the set of archetypes to which each user of the other users has a minimum cosine distance.

9. A method comprising:

retrieving, with a computer system, by one or more processors, transaction data of offline store transactions at one or more offline stores during an online marketing campaign associated with an item, the transaction data comprising store conversion rate data of the item in the one or more offline stores during the online marketing campaign;

retrieving, with the computer system, user data from user devices of a plurality of users that are exposed to a plurality of online marketing channels associated with the online marketing campaign, the user data comprising online behavior data of the plurality of users obtained by text mining one or more of an Internet browsing history or Internet cookies associated with each user of the plurality of users;

identifying, with the computer system, one or more users of the plurality of users exposed to the plurality of online marketing channels that also have purchased the item at an offline store of the one or more offline stores by matching information of one or more marketing data attributes between (a) the store conversion rate data of the transaction data and (b) the online behavior data of the user data;

determining, with the computer system and at least one cause of one or more incremental impacts of the one or more marketing data attributes on the offline store transactions using the transaction data associated with the one or more users during the online marketing campaign using a first set of rules, by determining which of the one or more marketing data attributes are factors in driving a revenue or the store conversion rate data of the item or a brand of the item in the one or more offline stores, wherein the first set of rules comprises:

identifying test users to be exposed to the online marketing campaign and who visit the one or more offline stores during the online marketing campaign;

mapping the test users into a multidimensional space, wherein an origin of the multidimensional space represents a best match on the one or more marketing data attributes;

identifying, using a proxy control group algorithm, a subgroup of users of the plurality of users representing users of the plurality of users that are exposed to the online marketing campaign to identify an incremental impact for each of the one or more marketing data attributes while keeping other ones of the one or more marketing data attributes constant;

mapping the subgroup of users into the multidimensional space;

determining a quality of matching the information of the one or more marketing data attributes; and adjusting for biases in the test users and the subgroup of users, wherein determining the at least one cause of the incremental impact of the one or more marketing data attributes further comprises determining the at least one cause of the incremental impact of the one or more marketing data attributes based at least in part on second user data of the test users and the user data of the subgroup of users; and modifying, with the computer system, the online marketing campaign in real-time based at least in part on the at least one cause of the one or more incremental impacts as determined.

10. The method of claim 9, further comprising:
determining attribution of the plurality of online marketing channels to the offline store transactions based at least in part on matching of the information of the one or more marketing data attributes between the store conversion rate data of the transaction data and the online behavior data of the user data.

11. The method of claim 9, wherein the transaction data comprises the revenue of the item or the brand of the item in the one or more offline stores during the online marketing campaign.

12. The method of claim 9, wherein the plurality of online marketing channels comprise at least one of one or more advertising exchanges, one or more search engines, one or more websites, one or more online video sites, or one or more social networks.

13. The method of claim 9, wherein the online marketing campaign is associated with marketing media comprising media transmitted via at least one of online, radio, video games, cell phones, personal digital assistants, or emails that are associated with the item or the brand of the item.

14. The method of claim 9, wherein:
the method further comprises:
determining attribution of the plurality of online marketing channels to the offline store transactions based at least in part on matching of the information of the one or more marketing data attributes between the store conversion rate data of the transaction data and the online behavior data of the user data;
the transaction data comprises the revenue of the item or the brand of the item in the one or more offline stores during the online marketing campaign;
the plurality of online marketing channels comprise at least one of one or more advertising exchanges, one or more search engines, one or more websites, one or more online video sites, or one or more social networks;
the online marketing campaign is associated with marketing media comprising media transmitted via at least one of online, radio, video games, cell phones, personal digital assistants, or emails that are associated with the item or the brand of the item; and
the first set of rules comprises:
matching each user of the test users to a corresponding archetype in a set of archetypes learned over existing data, each archetype in the set of archetypes comprising a specific customer behavior;
determining a first proportion for each archetype in the set of archetypes based on a number of users of the test users matched to each archetype in the set of archetypes;
matching each user of the subgroup of users to a corresponding archetype in the set of archetypes;
determining a second proportion for each archetype in the set of archetypes based on a number of users of the subgroup of users matched to each archetype in the set of archetypes;
converting a behavior of each user of the test users and the subgroup of users to a vector space notation where each element is a term frequency inverse document frequency ("tfidf") for the behavior and each user of the test users and the subgroup of users represents a row in an M×N matrix with M users and N distinct behaviors; and
using a semantic indexing algorithm to find archetypes of the set of archetypes for other users of the plurality of users by assigning each user of the other users to an archetype of the set of archetypes to which each user of the other users has a minimum cosine distance.

15. The method of claim 9, wherein the first set of rules further comprises:
matching each user of the test users to a corresponding archetype in a set of archetypes learned over existing data, each archetype in the set of archetypes comprising a specific customer behavior;
determining a first proportion for each archetype in the set of archetypes based on a number of users of the test users matched to each archetype in the set of archetypes;
matching each user of the subgroup of users to a corresponding archetype in the set of archetypes;
determining a second proportion for each archetype in the set of archetypes based on a number of users of the subgroup of users matched to each archetype in the set of archetypes;
converting a behavior of each user of the test users and the subgroup of users to a vector space notation where each element is a term frequency inverse document frequency ("tfidf") for the behavior and each user of the test users and the subgroup of users represents a row in an M×N matrix with M users and N distinct behaviors; and
using a semantic indexing algorithm to find archetypes of the set of archetypes for other users of the plurality of users by assigning each user of the other users to an archetype of the set of archetypes to which each user of the other users has a minimum cosine distance.

16. An apparatus comprising:
a memory configured to store data and one or more sets of instructions; and
one or more processors coupled to the memory, the one or more processors configured to execute the one or more sets of instructions and perform operations comprising:
retrieving transaction data of offline store transactions at one or more offline stores during an online marketing campaign associated with an item, the transaction data comprising: (1) store conversion rate data of the item in the one or more offline stores during the online marketing campaign; and (2) a revenue of the item or a brand of the item in the one or more offline stores during the online marketing campaign;
retrieving user data from user devices of a plurality of users that are exposed to a plurality of online marketing channels associated with the online marketing campaign, the user data comprising online behavior data of the plurality of users obtained by text mining one or more of an Internet browsing history or Internet cookies associated with each user of the plurality of users;
correlating the transaction data to the user data to identify at least a first user of the plurality of users exposed to the plurality of online marketing channels that also have purchased the item at an offline store of the one or more offline stores by matching information of one or more marketing data attributes between (a) the store conversion rate data of the transaction data and (b) the online behavior data of the user data;

determining, using a first set of rules, at least one cause of an incremental impact of the one or more marketing data attributes, by determining which of the one or more marketing data attributes is a factor in driving the revenue or the store conversion rate data of the item or the brand of the item in the one or more offline stores, on:
(1) the item in the one or more offline stores during the online marketing campaign; or
(2) the brand of the item in the one or more offline stores during the online marketing campaign,
wherein the first set of rules comprises:
identifying test users to be exposed to the online marketing campaign and who visit the one or more offline stores during the online marketing campaign;
mapping the test users into a multidimensional space, wherein an origin of the multidimensional space represents a best match on the one or more marketing data attributes;
identifying, using a proxy control group algorithm, a subgroup of users of the plurality of users representing users of the plurality of users that are exposed to the online marketing campaign to identify the incremental impact for each of the one or more marketing data attributes while keeping other ones of the one or more marketing data attributes constant;
mapping the subgroup of users into the multidimensional space;
determining a quality of matching the information of the one or more marketing data attributes; and
adjusting for biases in the test users and the subgroup of users, wherein determining the at least one cause of the incremental impact of the one or more marketing data attributes further comprises determining the at least one cause of the incremental impact of the one or more marketing data attributes based at least in part on second user data of the test users and the user data of the subgroup of users; and
modifying the online marketing campaign in real-time based at least in part on the at least one cause of the incremental impact as determined.

17. The apparatus of claim 16, wherein the one or more processors are further configured to perform an operation comprising:
determining attribution of the plurality of online marketing channels to transactions at the one or more offline stores based at least in part on the correlating of the transaction data to the user data.

18. The apparatus of claim 16, wherein the one or more processors are further configured to perform an operation comprising:
modifying the online marketing campaign in real-time based at least in part based on the at least one cause of the incremental impact as determined, or the correlating of the transaction data to the user data.

19. The apparatus of claim 16, wherein, in modifying the online marketing campaign in real-time the one or more processors are further configured to perform operations further comprising at least one of:
moving online marketing media for an online marketing channel of the plurality of online marketing channels to another online marketing channel of the plurality of online marketing channels;
modifying the online marketing media associated with the one or more marketing data attributes;
canceling the online marketing campaign in an online marketing channel of the plurality of online marketing channels; or
modifying implementation of the online marketing campaign.

20. The apparatus of claim 16, wherein the plurality of online marketing channels comprise at least one of one or more advertising exchanges, one or more search engines, one or more websites, one or more online video sites, or one or more social networks.

21. The apparatus of claim 16, wherein the online marketing campaign is associated with marketing media comprising media transmitted via at least one of online, radio, video games, cell phones, personal digital assistants, or emails that are associated with the item or the brand of the item.

22. The apparatus of claim 16, wherein:
the online marketing campaign is associated with marketing media comprising media transmitted via at least one of online, radio, video games, cell phones, personal digital assistants, or emails that are associated with the item or the brand of the item;
the one or more processors are further configured to perform operations comprising:
determining attribution of the plurality of online marketing channels to transactions at the offline store based at least in part on the correlating;
modifying the online marketing campaign at least in part based on the correlating;
modifying the online marketing campaign in real-time comprises at least one of:
moving online marketing media for a first online marketing channel of the plurality of online marketing channels to another online marketing channel of the plurality of online marketing channels, wherein the marketing media comprises the online marketing media;
modifying the online marketing media associated with the one or more marketing data attributes;
canceling the online marketing campaign in a second online marketing channel of the plurality of online marketing channels, the plurality of online marketing channels comprising at least one of one or more advertising exchanges, one or more search engines, one or more websites, one or more online video sites, or one or more social networks; or
modifying implementation of the online marketing campaign;
matching each user of the test users to a corresponding archetype in a set of archetypes learned over existing data, each archetype in the set of archetypes comprising a specific customer behavior;
determining a first proportion for each archetype in the set of archetypes based on a number of users of the test users matched to each archetype in the set of archetypes;
matching each user of the subgroup of users to a corresponding archetype in the set of archetypes;
determining a second proportion for each archetype in the set of archetypes based on a number of users of the subgroup of users matched to each archetype in the set of archetypes;
converting a behavior of each user of the test users and the subgroup of users to a vector space notation where each element is a term frequency inverse document frequency ("tfidf") for the behavior and each user of the test users and the subgroup of users represents a row in an M×N matrix with M users and N distinct behaviors; and using a semantic indexing algorithm to find archetypes of the set of archetypes for other users of the plurality of users by assigning each user of the other users to an archetype of the set of archetypes to which each user of the other users has a minimum cosine distance.

23. The apparatus of claim 16, wherein the first set of rules further comprises:

matching each user of the test users to a corresponding archetype in a set of archetypes learned over existing data, each archetype in the set of archetypes comprising a specific customer behavior;

determining a first proportion for each archetype in the set of archetypes based on a number of users of the test users matched to each archetype in the set of archetypes;

matching each user of the subgroup of users to a corresponding archetype in the set of archetypes;

determining a second proportion for each archetype in the set of archetypes based on a number of users of the subgroup of users matched to each archetype in the set of archetypes;

converting a behavior of each user of the test users and the subgroup of users to a vector space notation where each element is a term frequency inverse document frequency ("tfidf") for the behavior and each user of the test users and the subgroup of users represents a row in an M×N matrix with M users and N distinct behaviors; and using a semantic indexing algorithm to find archetypes of the set of archetypes for other users of the plurality of users by assigning each user of the other users to an archetype of the set of archetypes to which each user of the other users has a minimum cosine distance.

* * * * *